July 10, 1934.  T. W. VAN DERVEER  1,965,816
SCREENING APPARATUS
Filed May 26, 1930
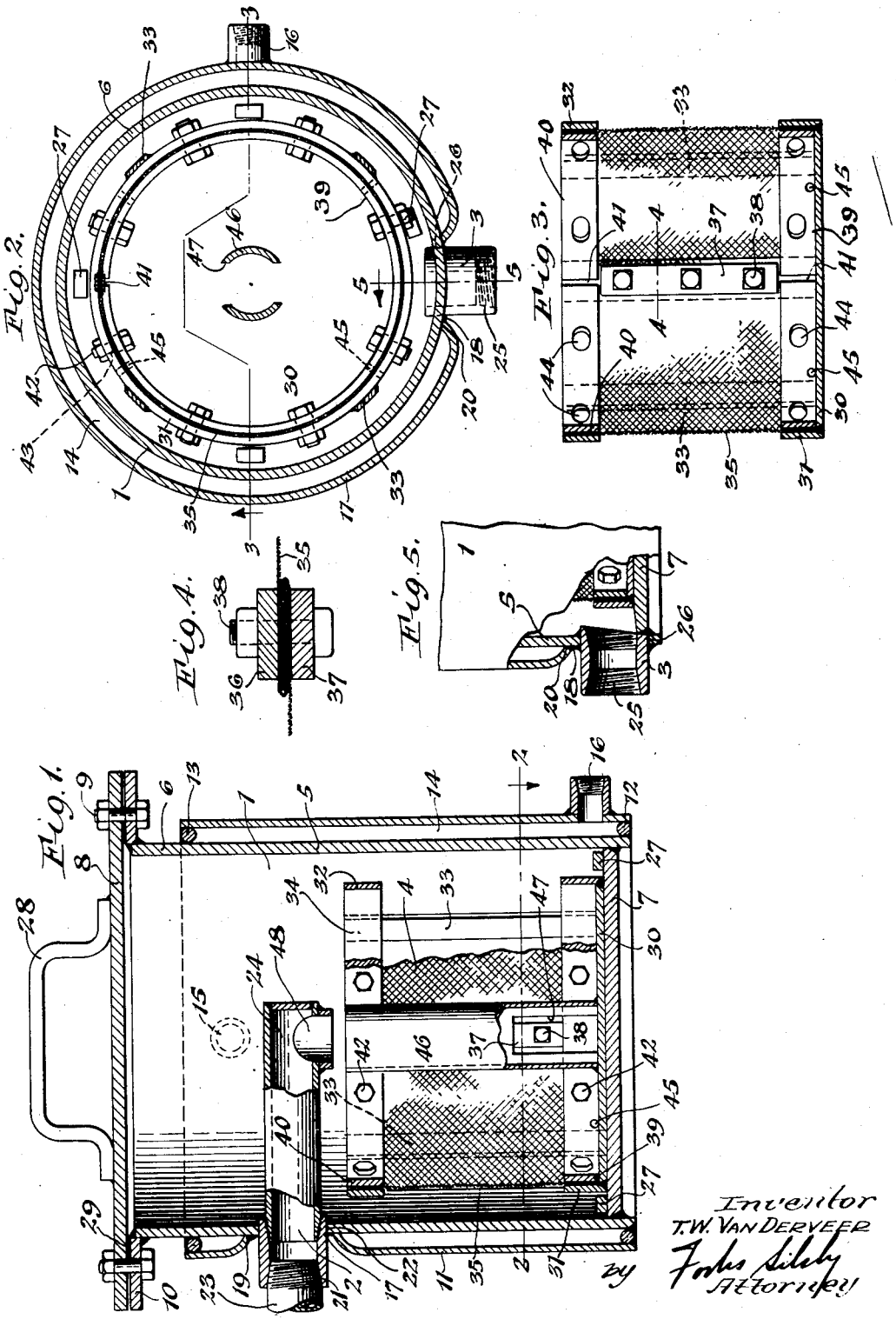

Patented July 10, 1934

1,965,816

UNITED STATES PATENT OFFICE 1,965,816

SCREENING APPARATUS

Theodore W. Derveer, Kenmore, N. Y., assignor to National Aniline and Chemical Company, Inc., New York, N. Y., a corporation of New York Application May 26, 1930, Serial No. 455,744

6 Claims. (Cl. 210—154)

This invention relates to a screening apparatus and more particularly to an apparatus for screening liquids for the removal of solid material therefrom.

In the manufacture of certain chemical products, it frequently happens that undesired solid material, such as iron scaling, bits of packing, rust, carbon and the like, is picked up by the product during the process of manufacture. In order to remove such undesired solid material from the products, and particularly tar-like, semi-solid material from organic chemical products which have relatively high melting points and relatively high vapor pressure at their melting points, such as naphthalene and phthalic anhydride, the products are passed in liquid condition through a screen capable of retaining the solid and semi-solid material.

An object of the present invention is to provide an apparatus for screening such normally solid material in molten condition.

Another object of the invention is to provide a screening apparatus which will be efficient in operation and inexpensive to manufacture, and which has a low maintenance cost.

A further object of the invention is to provide a screening apparatus for removing solid material from molten normally solid substances which have high vapor pressures at their melting points, which apparatus is simple in construction, operates automatically and without attention, and which may be readily taken apart for cleaning and repairing.

Other objects of the invention will in part be obvious and will in part appear hereinafter.

The invention accordingly comprises the novel features of construction, combination of elements, and arrangement of parts which are adapted to accomplish such objects, all as exemplified in the following detailed disclosure and illustrated in the accompanying drawing. The scope of the invention will be indicated in the claims.

In its general aspect, the apparatus of the present invention comprises a closed vessel adapted for passing through it normally solid material in molten condition, and means within the vessel for removing solid material carried by the molten material. In a preferred embodiment of the invention, the apparatus comprises a closed vessel having a removable cover, inlet and outlet means, and means for maintaining the vessel at a temperature above the melting point of the molten solid; and a strainer within the vessel comprising a removable frame, a screen, and means for securing the screen within the frame.

For a fuller understanding of the nature and objects of the invention reference should be had to the following detailed description and the accompanying drawing which present an illustrative embodiment of an apparatus constructed in accordance with the invention.

Figure 1 of the drawing is a vertical sectional view of the assembled apparatus;

Figure 2 is a horizontal sectional view of the apparatus taken along the line 2—2 of Figure 1;

Figure 3 is a vertical sectional view of the screening member taken along the line 3—3 of Figure 2;

Figure 4 is a fragmentary sectional view taken along the line 4—4 of Figure 3, and Figure 5 is a fragmentary sectional view taken along the line 5—5 of Figure 2.

Referring to the drawing, the apparatus comprises a jacketed vessel 1 having an inlet 2 and an outlet 3, and containing a removable strainer or screening member 4.

The vessel 1 comprises a cylindrical shell 5 formed of metal or other suitable material, and having a wall portion 6, a bottom portion 7, and a removable cover 8, secured by bolts 9 to a flange 10 formed on the upper edge of the shell 5. The wall portion 6 of the shell 5 is partially enclosed by an annular cylinder 11 spaced from the wall 6 by rings 12 and 13, which are secured to the cylinder 11 and wall portion 6, as by welding, to form a jacketing chamber 14. Inlet and outlet connections 15 and 16, in the cylinder 11, provide means for the circulation of a heating fluid, such as steam or heated oil, through the jacketing chamber 14. The cylinder 11 is further provided with openings 17 and 18, and is depressed adjacent to these openings to form with the shell 5 joints 19 and 20 which are suitably sealed, as by welding, to prevent leakage from the chamber 14 into the interior of the vessel 1. This feature of construction is of importance in connection with the screening of such materials as molten phthalic anhydride in which steam is used as the heating medium in chamber 14; inasmuch as the leakage of steam or condensed water from the chamber 14 into the vessel 1 would cause the formation of phthalic acid, an undesired impurity in the product, which would eventually plug the apparatus. A threaded nipple 21, passing through the opening 17 and a corresponding opening 22 in the cylindrical shell 5, and secured to the shell 5 and cylinder 11, as by welding, comprises the inlet 2 and forms a connection for a supply pipe 23 and a removable feed pipe 24. A threaded nipple 25, passing through the opening 18 and a corresponding opening 26 in the shell 5, and secured to the shell 5 and cylinder 11, as by welding, forms the outlet 3 for the vessel. Guide blocks 27, secured to the bottom 7 of the shell, as by welding, serve to center the screening member 4 within the vessel. The cover 8 is provided with a handle 28; and packing 29 between the cover 8 and flange 10 provides against loss of volatile material by leakage from the vessel 1.

The strainer or screening member 4 comprises a circular plate 30, a ring 31 adjacent to the plate, a similar ring 32 supported above the plate concentrically with ring 31 by bars 33, all suitably joined together, as by welding, to form a frame 34, and a screen 35 removably secured within the frame 34. The screen, which is formed of suitable foraminous material and is shown as a sheet of wire filter-cloth of fine mesh (300–400 mesh) rolled into the form of a cylinder with the ends of the cloth lapped over and secured between straps 36 and 37 by bolts 38, is held within the frame 34 by split rings 39 and 40 and bolts 42, which pass through holes 43 in the frame 34, suitable holes in the screen, and slots 44 in the rings 39 and 40. By means of the slots 44 and the spaces 41 between the ends of the rings 39 and 40, the apparatus is adaptable to screens of various thicknesses and kinds of material. Drain holes 45 in the rings 31 and 39 prevent the retention of the material being filtered within ring 39. A distributing pipe 46 having longitudinal openings 47 in the lower portion thereof, and suitably secured to the plate 30 axially of the screening member 4, as by welding, serves to distribute over the lower portion of the screening member 4 the material delivered to it by feed-pipe 24, thereby preventing splashing. The feed-pipe 24, which is closed at its inner end and has a side outlet 48 of smaller diameter than the distributing pipe 46, is so constructed that when inserted in operative position in the vessel 1, the outlet 48 is above, and concentric with, the distributing pipe 46.

In the operation of the embodiment of the invention above described, steam or other suitable heating medium is circulated through the jacketing chamber 14 in order to heat the apparatus to a temperature above the melting point of the material to be screened suitable to maintain it in fluid condition (for example, to about 140° to 160° C. in the case of phthalic anhydride); the molten material is fed into the apparatus through pipe 23; it is delivered by pipe 24 to distributor 46, by which it is distributed over the screen 35; it then passes through the screen 35, which removes and retains the undesired solid matter; and the purified material passes out of the vessel through outlet 3.

At the completion of a run, or whenever it is desired to inspect or to clean the screen, bolts 9 are unscrewed, the cover 8 is removed, feed-pipe 24 is unscrewed and removed, and the screening member 4 is lifted from the vessel 1. If it is desired to repair or replace the screen 35, it may be readily removed from the frame 34 by unscrewing the bolts 42 and removing rings 39 and 40. It will be noted, however, that ordinarily, as for cleaning, the screen 35 need not be removed from the frame 34, whereby the disassembling of the apparatus and its reassembling are facilitated.

It will be readily apparent from a consideration of the above disclosure that the invention is not limited to the specific embodiment above described, and that changes in the construction, combination and arrangement of the parts set forth may be made without departing from the scope of the invention. Accordingly, it is intended that all matter contained in the above description and shown in the accompanying drawing shall be interpreted as illustrative, and not in a limiting sense, except as limited by the claims.

It is also to be understood that the following claims are intended to cover, in addition to the generic and specific features of the invention herein described, all statements of the scope of the invention which, as a matter of language, might be said to fall therebetween.

I claim:

1. A screening apparatus for removing solid matter from a normally solid material in molten condition comprising a closed vessel, an inlet to said vessel, an outlet from said vessel, a heating jacket for said vessel adapted to contain steam, sealing material between said jacket and said vessel at said inlet and said outlet, to prevent leakage of steam from said jacket into said vessel, and means within the vessel for removing solid matter carried by said molten material.

2. A screening apparatus for removing solid matter from a normally solid material in molten condition comprising a vessel, an inlet to said vessel, an outlet from said vessel, a heating jacket for said vessel adapted to contain steam, sealing material between said jacket and said vessel at said inlet and said outlet to prevent leakage of steam from said jacket into said vessel, a screening member loosely mounted within said vessel for ready removal therefrom having a closed bottom and pervious side walls, and means for introducing the material to be screened into said screening member.

3. A screening apparatus comprising a vessel, a removable cover for closing said vessel to the atmosphere, a screening member loosely mounted within said vessel for ready removal therefrom, said screening member comprising a frame having a closed bottom, a screen carried by said frame and forming a side wall of said member, an adjustable ring engaging said screen, and means for securing said screen between said ring and said frame, a heating jacket for said vessel, means for introducing material to be screened into said screening member, and means for withdrawing screened material from said vessel.

4. An apparatus for removing solid impurities from phthalic anhydride in molten condition comprising a vessel, a removable cover for closing said vessel to the atmosphere, a heating jacket for said vessel adapted to contain steam, sealing material between said jacket and said vessel to prevent the leakage of steam from said jacket into said vessel, a screening member loosely mounted within said vessel for ready removal therefrom, said screening member comprising a frame having a closed bottom, a screen of fine mesh carried by said frame and forming the side walls of said member, an adjustable ring engaging said screen, means for securing said screen between said ring and said frame, means mounted in said screening member for distributing phthalic anhydride in molten condition to said screen, a feed-pipe removably mounted within said vessel for introducing molten phthalic anhydride to be screened into said distributing means, and an outlet in said vessel for removing the screened phthalic anhydride.

5. A screening apparatus for removing tarry solid matter from phthalic anhydride in molten condition comprising a vessel, a removable cover for closing said vessel to the atmosphere, an inlet to said vessel for introducing phthalic anhydride in molten condition containing solid tarry matter, an outlet from said vessel to remove screened phthalic anhydride in molten condition, a heating jacket for said vessel adapted to contain steam, sealing material between said jacket and said vessel to prevent leakage of steam from said jacket into said vessel, a screening member loosely mounted within said vessel for ready removal therefrom having a closed bottom wall and pervious side walls for removing the solid tarry matter from the phthalic anhydride in molten condition, and a feed-pipe connected to said inlet within said vessel for introducing the phthalic anhydride to be screened into said screening member.

6. A screening apparatus for removing solid matter from a normally solid material in molten condition comprising a vessel, a removable cover for closing said vessel to the atmosphere, an inlet to said vessel, an outlet from said vessel, a heating jacket for said vessel adapted to contain steam, sealing material between said jacket and said vessel at said inlet and outlet to prevent leakage of steam from said jacket into said vessel, a feed-pipe in said vessel removably mounted in said inlet, and a screening member loosely mounted within said vessel for ready removal therefrom comprising the combination of a removable plate, a ring secured to said plate, a ring mounted on bars in spaced relation to said plate, forming a frame having a closed bottom, a screen secured within said frame forming the side walls of said member, and a distributor pipe mounted in said frame in cooperating relation with said feed-pipe.

THEODORE W. VAN DERVEER.